United States Patent
Willard et al.

(10) Patent No.: US 9,238,401 B2
(45) Date of Patent: Jan. 19, 2016

(54) Z-FOLD CONVERTIBLE TOP SUPPORTING RETRACTABLE QUARTER WINDOW

(71) Applicant: Magna Car Top Systems of America, Inc., Auburn Hills, MI (US)

(72) Inventors: Michael Willard, Harrison Township, MI (US); Wolfgang Richter, Commerce Township, MI (US); George F. Purcell, Southgate, MI (US); Robert E. Fallis, III, Rochester, MI (US)

(73) Assignee: Magna Car Top Systems of America, Inc., Auburn Hills, MI (US)

( * ) Notice: Subject to any disclaimer, the term of this patent is extended or adjusted under 35 U.S.C. 154(b) by 74 days.

(21) Appl. No.: 14/196,198

(22) Filed: Mar. 4, 2014

(65) Prior Publication Data

US 2014/0252795 A1 Sep. 11, 2014

Related U.S. Application Data

(60) Provisional application No. 61/773,451, filed on Mar. 6, 2013.

(51) Int. Cl.
*B60J 7/12* (2006.01)

(52) U.S. Cl.
CPC .............. *B60J 7/1252* (2013.01); *B60J 7/1247* (2013.01); *B60J 7/1265* (2013.01)

(58) Field of Classification Search
CPC ...... B60J 7/1247; B60J 7/1252; B60J 7/1265; B60J 7/1269; B60J 7/1273; B60J 7/1286
See application file for complete search history.

(56) References Cited

U.S. PATENT DOCUMENTS

| | | | | |
|---|---|---|---|---|
| 2,479,599 | A | * | 8/1949 | Bessonneau .................. 296/116 |
| 2,686,078 | A | * | 8/1954 | Hale et al. ..................... 296/116 |
| 2,762,649 | A | * | 9/1956 | Doty ............................. 296/116 |
| 4,778,215 | A | * | 10/1988 | Ramaciotti .......... B60J 71/1286 296/107.07 |
| 5,106,145 | A | | 4/1992 | Corder |
| 5,118,158 | A | * | 6/1992 | Truskolaski ............. 296/146.14 |
| 5,620,226 | A | | 4/1997 | Sautter, Jr. |
| 6,048,021 | A | | 4/2000 | Sautter, Jr. |
| 6,416,111 | B1 | | 7/2002 | Neubrand |
| 6,464,284 | B2 | | 10/2002 | Neubrand |
| 6,623,063 | B1 | * | 9/2003 | Grubbs et al. ........... 296/107.09 |
| 6,629,719 | B2 | | 10/2003 | Sims |
| 6,666,494 | B2 | | 12/2003 | Antreich |

(Continued)

FOREIGN PATENT DOCUMENTS

| | | | | |
|---|---|---|---|---|
| DE | 19613356 A1 | * | 10/1997 | ............. B60J 7/1265 |
| DE | 10039853 C1 | * | 9/2001 | ............. B60J 7/1265 |

(Continued)

*Primary Examiner* — Glenn Dayoan
*Assistant Examiner* — Paul Chenevert
(74) *Attorney, Agent, or Firm* — Brooks Kushman P.C.

(57) ABSTRACT

A Z-fold convertible top has a frame supporting a textile cover. The frame includes support in the form of at least one of a pair of pivoted rails rigidly mounted to a bow, stabilizing other pivoted rails. The stability may be employed to displace a quarter window with the rail in a manner that provides a compact top stack packaged in the vehicle body. The stability is also employed to coordinate sealing engagement of the quarter window with a cloth control link pivoted to the vehicle body ground, but displacing the cloth away from the window during retraction. A worm link may enhance interaction between the cloth control link and the rail supporting a quarter window.

14 Claims, 10 Drawing Sheets

(56) References Cited

U.S. PATENT DOCUMENTS

| | | |
|---|---|---|
| 6,802,554 B1 | 10/2004 | Just et al. |
| 6,966,599 B2 | 11/2005 | Willard |
| 7,334,831 B2 | 2/2008 | Wezyk et al. |
| 7,497,498 B2 | 3/2009 | Theuerkauf |
| 7,658,008 B2 | 2/2010 | Just et al. |
| 7,690,716 B2 | 4/2010 | Dilluvio |
| 8,002,326 B2 | 8/2011 | Neubrand |
| 8,025,328 B2 | 9/2011 | Dilluvio et al. |
| 8,042,856 B2 | 10/2011 | Willard et al. |
| 2002/0084673 A1 | 7/2002 | Neubrand |
| 2003/0038501 A1 | 2/2003 | Heselhaus |
| 2004/0046415 A1 | 3/2004 | Heselhaus |
| 2004/0056506 A1* | 3/2004 | Nania ............... 296/107.09 |
| 2004/0262942 A1 | 12/2004 | Willard |
| 2006/0061129 A1 | 3/2006 | Dilluvio |
| 2006/0097542 A1 | 5/2006 | Dilluvio |
| 2007/0102954 A1 | 5/2007 | Wezyk et al. |
| 2007/0205630 A1* | 9/2007 | Hollenbeck ............ 296/107.04 |
| 2008/0106117 A1* | 5/2008 | Garska et al. ............ 296/118 |
| 2008/0284200 A1 | 11/2008 | Dilluvio et al. |
| 2008/0315633 A1* | 12/2008 | Antreich et al. .......... 296/223 |
| 2009/0261615 A1* | 10/2009 | Purcell ................. 296/108 |
| 2010/0156136 A1 | 6/2010 | Neubrand |
| 2010/0164247 A1 | 7/2010 | Neubrand |
| 2010/0187854 A1 | 7/2010 | Willard |
| 2013/0093207 A1* | 4/2013 | Richter et al. .......... 296/107.09 |

FOREIGN PATENT DOCUMENTS

| | | | | |
|---|---|---|---|---|
| EP | 0606019 A1 * | 7/1994 | ........... | B60J 7/146 |
| EP | 2184192 A1 * | 5/2010 | ........... | B60J 7/12 |
| WO | WO 2010006656 A1 * | 1/2010 | ........... | B60J 7/12 |

* cited by examiner

Z-FOLD CONVERTIBLE TOP SUPPORTING RETRACTABLE QUARTER WINDOW

CROSS-REFERENCE TO RELATED APPLICATIONS

This application claims the benefit of U.S. provisional Application No. 61/773,451 filed Mar. 6, 2013.

TECHNICAL FIELD

The present invention relates to a Z-fold convertible top in which the frame supporting the textile includes support in the form of a rigid bow and rail combination forming an arch for displacement of a quarter window with the rail in a manner that provides a compact top stack packaged in the vehicle body.

BACKGROUND

Convertible tops for vehicles include a frame having articulated links on lateral sides of the vehicle. A plurality of bows are covered by a flexible fabric covering and supported by the articulated links that generally pivot about pivot pins or joints that have a transverse pivot axis. The convertible top is displaced to and between an extended position covering the vehicle passenger compartment, and a retracted position. The textile covering is folded with the frame when released from taut engagement with the frame in a closed position in which a front bow may be releasably attached to a windshield header, and a rear bow retains the top against the vehicle body.

A storage area rearward of the passenger seating receives the convertible top frame including bows and articulating links when the top is retracted. During displacement, the numerous connections in the frame may require tolerances to accommodate the stacking, and the frame does not rigidly support structures such as windows that may also serve to enclose the passenger compartment.

Typically, the displacement of windows that serves to complete the enclosure are separately supported and displaced by mechanisms carried in the vehicle body. The combinations of structures further reduce interior space. Moreover, separate mechanisms render the sealing of the top more difficult in the closed position, and may interfere with climate control in the interior and the overall aesthetic appearance of the vehicle's exterior.

SUMMARY

The present invention overcomes the above-mentioned disadvantages by providing a Z-fold convertible top in which the frame supporting the textile includes at least one crossbar or bow that is rigidly attached to articulated rails of the frame. Those members form a unitary arch that maintains rigidity laterally and longitudinally in the frame throughout pivoting displacement of the rails with respect to a member grounded to the vehicle body.

In one embodiment, a rigid bow structure is joined by fasteners, for example, at overlapping portions of the laterally spaced rails engaging the bow, and each rail is pivotally mounted to a side plate grounding the framework with respect to the vehicle body and providing a pivot joint for displacement of the rigid side rails and crossbar combinations forming a unitary arch. Such an arch may provide stable displacement of a quarter window carried by the rail.

Another embodiment includes two rigid bow support constructions, for example, the rear rail arch discussed above, and a three bow joined to laterally spaced rails also pivotally grounded with respect to the vehicle body, for example, a pivot connection to side plates grounded by rigid connection to the vehicle body.

Another alternative for a rigid bow structure may be employed by pivotally joining a one-bow structure to a side rail on each lateral side of the top. The side rails are similarly grounded to the vehicle body by a pivotal connection, for example, on mounting plates secured to lateral sides of the vehicle body. In an embodiment illustrated, for example, a simple pivot connection between the one bow and laterally spaced side rails may be used to form a rigid or unitary bow arch that permits movement of the one bow about the pivot axis connecting the bow to the side rail as the side rail pivots about the lower side rail pivot connection with respect to the vehicle body ground or side mounting plate for displacing the rigid arch.

The use of one or more rigid bow assemblies combining the bow with laterally spaced rails displaceably grounded with respect to the vehicle body provide greater control and ease of movement between the cover and frame linkages including rails, bows and linkages as they move to and between a closed top (extended) position and a compact (retracted) top stack position within the vehicle body compartment.

In an embodiment, a rigid arch structure may support an articulating quarter window frame for displacement with the rigid or unitary arch into the compacted top stack in the top's fully retracted (top stack) storage position. In addition, a second rigid arch structure may be defined by the three bow and laterally spaced rails also pivotally displaceable with respect to the grounded support, such as a top-mounting side plate. Displacement of the mounted quarter window frame by the top may reduce or eliminate the mass and/or packaging space previously required for window drop, such as regulator, motor, controls and guide tracks. A four bar linkage may support the one bow with respect to laterally spaced side rails and a displacement or balance linkage may displace the side rail relative to the other rails in the frame.

An embodiment may include an alternative kinematic apparatus in which laterally spaced side rails are pivotally coupled to ends of the one bow. The side rails include a riser portion angled with respect to a main body portion of the side rail. The riser portion of the side rail is pivotally secured to a grounded structure, for example, a portion of the vehicle body or an additional mounting plate fixed to the vehicle body. An orienting linkage, for example, a simple pivot, retracts the one bow rearwardly above the side rail and above the other bows in the stacked position. The kinematics of the frame are shown in detail in the accompanying figures. The configured side rail with the main body portion and the riser provides support for a seal that may be formed in one piece along the rail for engagement with adjacent window glass. The window glass that mates with the seal may be controlled by a separate mechanism as in previous known vehicle constructions or by the window glass seal carried by an adjacent unitary arch in the frame. The dual pivots permit a one piece seal to be engaged by the door glass assembly and interface with the quarter glass assembly.

An embodiment of the convertible top may include a cloth control link to enable proper storage of the cloth within the storage area. A convertible top textile is secured to the cloth control link and mates closely with a seal carried by the quarter window assembly in the extended (closed position). During retraction, the quarter window assembly is displaced with the pivoting of the rear rail. The cloth control link moves the textile rearwardly of the two bow arch carrying the quarter window assembly, thereby avoiding the short displacement that could restrict top stock formation if the cloth were tied to the quarter window assembly. Sealing engagement of the cloth with respect to the seal need not be maintained when the convertible top is retracted in the storage compartment. The top may include a textile control link that positions the cloth against a quarter window frame-supported seal in the extended (closed top) position. The cloth control rail accommodates the extra length that the cloth is displaced rearwardly into the storage compartment beyond the location of the retracted position of the quarter window by articulating on an adjacent link, for example, a pivoted cloth control link or a balance link. The cloth control link may be pivoted about an axis rearwardly of the pivot axis for the quarter window, for example, in a rearward portion of the mounting plate. In that embodiment, the cloth control link provides extended length beyond the rear rail controlled quarter window to facilitate packaging of the textile with the stacking framework in the storage area.

In an embodiment, displacement of the control link may be further assisted by a worm link shaped for controlling packaging of the top between the linkage members and the relative movement of the frame members pivoting throughout displacement of the top. As shown in the accompanying figures, a shaped worm link has ends that may be fastened by a swivel connection to the balance link and another linkage member. In an embodiment, a forward control link, a link carried by the balance link, or a link carried by the control link carrying the three bow, may assist in placement of the textile and the frame within the storage compartment and maintain coordinated, orderly arrangement of components of the framework with the cloth. While a simple strap may be used to maintain position between the coupled links, an illustrated embodiment is adjustable and configured to avoid interferences during displacement.

An embodiment of the present invention may provide a tensioning bow having a pivot with respect to the rearward portion of the top, such as the rear bow or rear portion of the vehicle. For example, a bracket may be pivotally secured to a rear wall of the vehicle near the tack strip for the top. As shown in the drawing figures, the vehicle body ground or tack strip supports a pivot joint linking to the rear of the tensioning bow. When the top is in its extended (closed) position, the tensioning bow is biased or raised to press the textile toward the body panel to avoid gaps that may otherwise appear at the interior edge of the body panels. The biasing of the tensioning bow may be controlled by coupling the bow to a portion of the kinematic structure of the frame. For example, the tensioning bow may be driven by coupling to a link, such as the cloth control link, although other rails or control links in the frame may be used. When the frame is retracted, the forward arms of the tensioning bow are driven downward by a linkage so that the tensioning bow and the textile carried by the retracting frame are displaced downwardly for more packaging space for the top stack in the down and stacked position of the frame. The descent of the tensioning bow when the top is opened permits the backlight and the frame to be freely received in the storage position.

In an embodiment, the cloth control link is used to drive the tensioning bow downward during retraction, but other parts may also be used. Preferably, the controlled displacement of the tensioning bow enables the textile to be stored at a position below the tack strip at which the textile is secured to the vehicle body panel.

When the tensioning bow is incorporated in the top, an arcuate bar forming the tensioning bow may support a cross member that serves as a support for a package tray or shelf panel. The crossbar may be configured, for example, as shown in the figures or otherwise, so that portions of the linkages such as the side rails may be recessed at a lower position within the top stack stored in the storage area. The rear shelf may be a removable panel or a textile cover that is carried by or connected to the crossbar. The crossbar may be carried by or coupled to the tensioning bow.

These and other aspects of this disclosure will be described in greater detail with reference to the attached drawings in the following detailed description of the illustrated embodiment of the disclosure.

BRIEF DESCRIPTION OF THE DRAWINGS

The present invention will be better understood by reference to the following detailed description when read in conjunction with the accompanying drawing sheets, in which like reference characters refer to like parts throughout the views, and in which.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
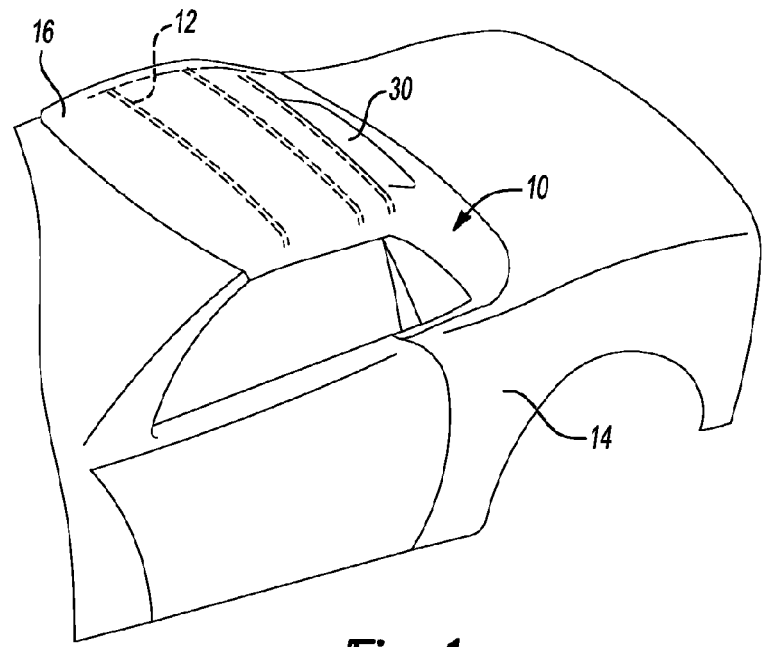
FIG. 1 is a perspective view of a vehicle with a convertible top embodiment according to the present invention.

Referring to FIG. 1, a Z-fold convertible top 10 is shown in part with only the left side of the top being illustrated. It should be understood that the right side of the top is a substantially mirror image of the left side of the top, but is not shown to avoid repetition. The convertible top 10 includes a frame in the form of a foldable top stack linkage 12 that includes a plurality of articulated links used to extend and retract a textile cover 16 of the convertible top 10 over the passenger compartment defined by the vehicle body 14 and to retract the top 10 into a storage area within the vehicle body. A textile cover 16, usually made of waterproof or treated fabric or cloth, is partially shown (left side only) carried by the frame 12.

Figure 2:
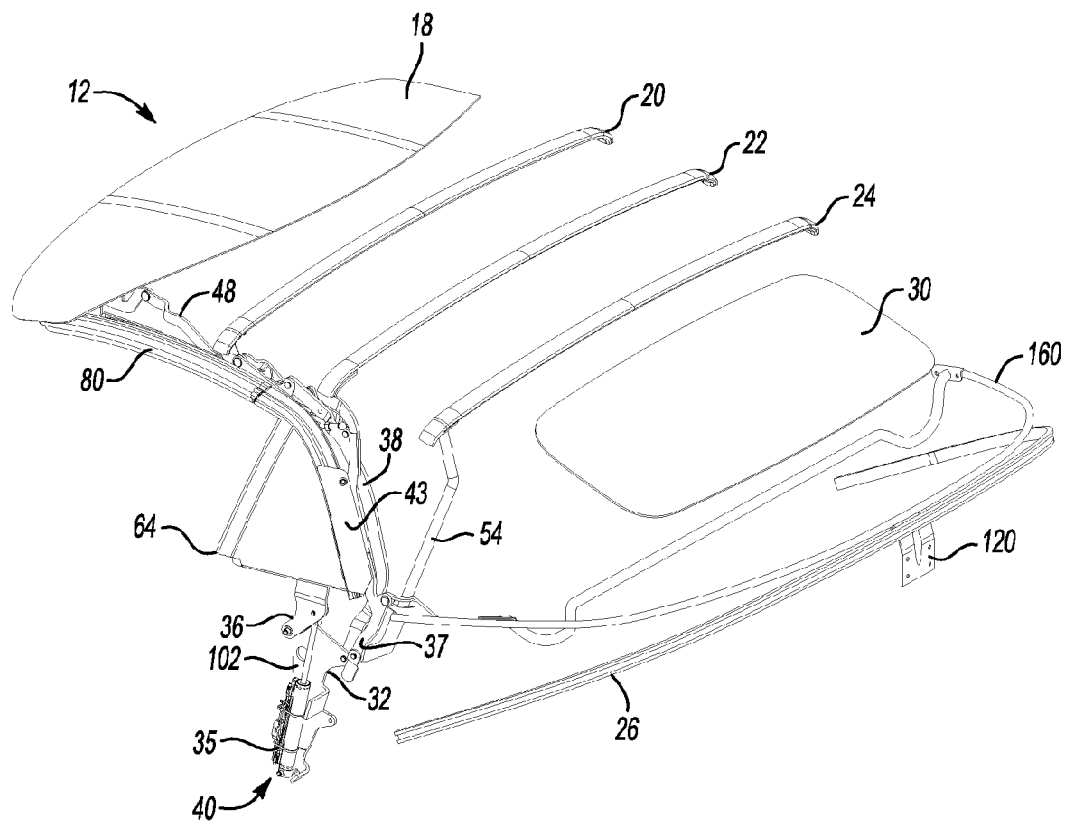
FIG. 2 is an enlarged exterior perspective view of a portion of an embodiment of a frame 12 for a top 10 as shown in FIG. 1 with the textile and the right hand parts removed for the sake of clarity.
Figure 3:
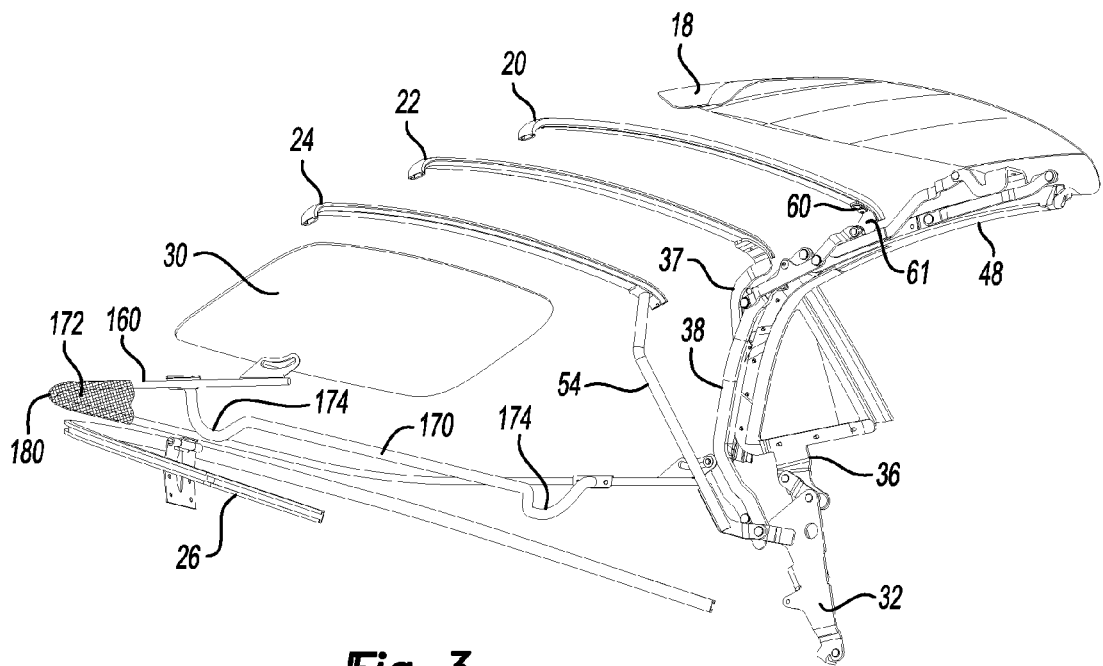
FIG. 3 is an interior perspective view of the left side parts shown in FIG. 2.

Referring to FIGS. 1 and 2, the frame 12 includes a one bow 18, a two bow 20, a three bow 22, a four bow 24 and a five bow 26. The bows are numbered one through five in order from front to rear as they arranged when the convertible top 10 is in its extended, or closed position covering the passenger compartment. The number of bows may vary depending upon the size and design of the top 10 and references to the rear bow should be understood to refer to the rearmost bow regardless of the total number of bows. A backlight 30 is supported by the textile cover 16 between the four bow 24 and the rear bow 26. In the illustrated embodiment, the rear bow 26 is a tack strip that locks the cover 16 to the vehicle body in the storage area at the rear of the vehicle body 14.

The convertible top 10 is moved between its extended (closed) and retracted (open) position and is generally guided by arms pivoted on a main pivot bracket 32 grounded to the vehicle body by welding, fasteners, or a modified configuration of the vehicle body panels, as may be described in detail in the following description. In the embodiment illustrated, a rear rail 36, a cloth control link 37 and a balance link 38 are pivotally secured to the main pivot bracket 32 and form part of the top stack linkage 12. The convertible top 10 is opened and closed by the top stack linkage 12. The convertible top 10 may be opened and closed manually. However, an actuator 40, such as a cylinder 35 or electric motor drive, may operatively connect to either the balance link, the rear rail or other part of the top stack linkage that is pivotally grounded to the vehicle body, for example, by a top mounting side plate of the main pivot bracket 32 mounted to the vehicle body.

Figure 8:
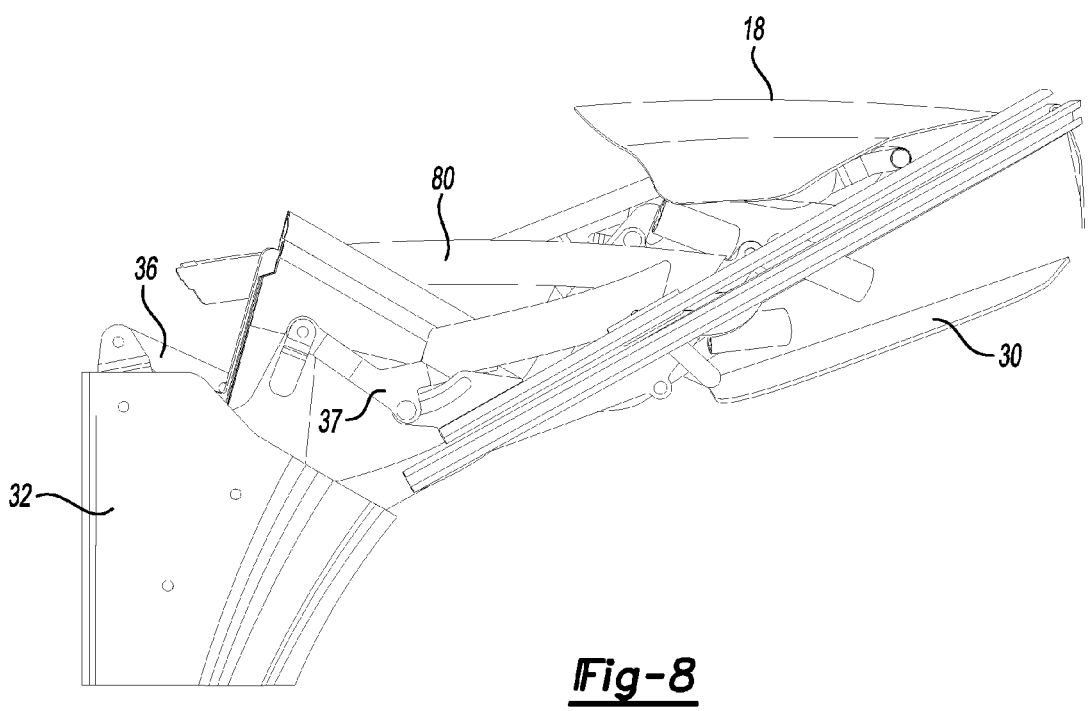
FIG. 8 is a side elevation view similar to FIGS. 6 and 7 but showing the top in the open (retracted) position.

In an embodiment, at least one, and preferably both, of the rear rail 36 and the cloth control link 37 are rigidly affixed to the bows 20 and 22, respectively, (see FIGS. 1-9) each forming a unitary arch. With each connection to the rails being rigid in the longitudinal and lateral directions, the rigid arch bow structure permits the unitary arches to provide stability as the top stack linkage 12 is moved between and to the extended position shown in FIG. 1 and the retracted position shown in FIG. 8. As may be described by the illustrated embodiment, any of the bows may be so supported without departing from the present invention. Other linkages may be used in supporting portions of the frame, as illustrated in an example of the one bow supported by a four bar linkage 48 carried by a side rail 80. An alternative kinematic top 11 (see FIGS. 10-13) also uses a simple pivotal connection with respect to the hinge box or other vehicle body ground for a side rail that is also pivotally coupled to the one bow 18, to form of a rigid or unitary arch.

Figure 9:
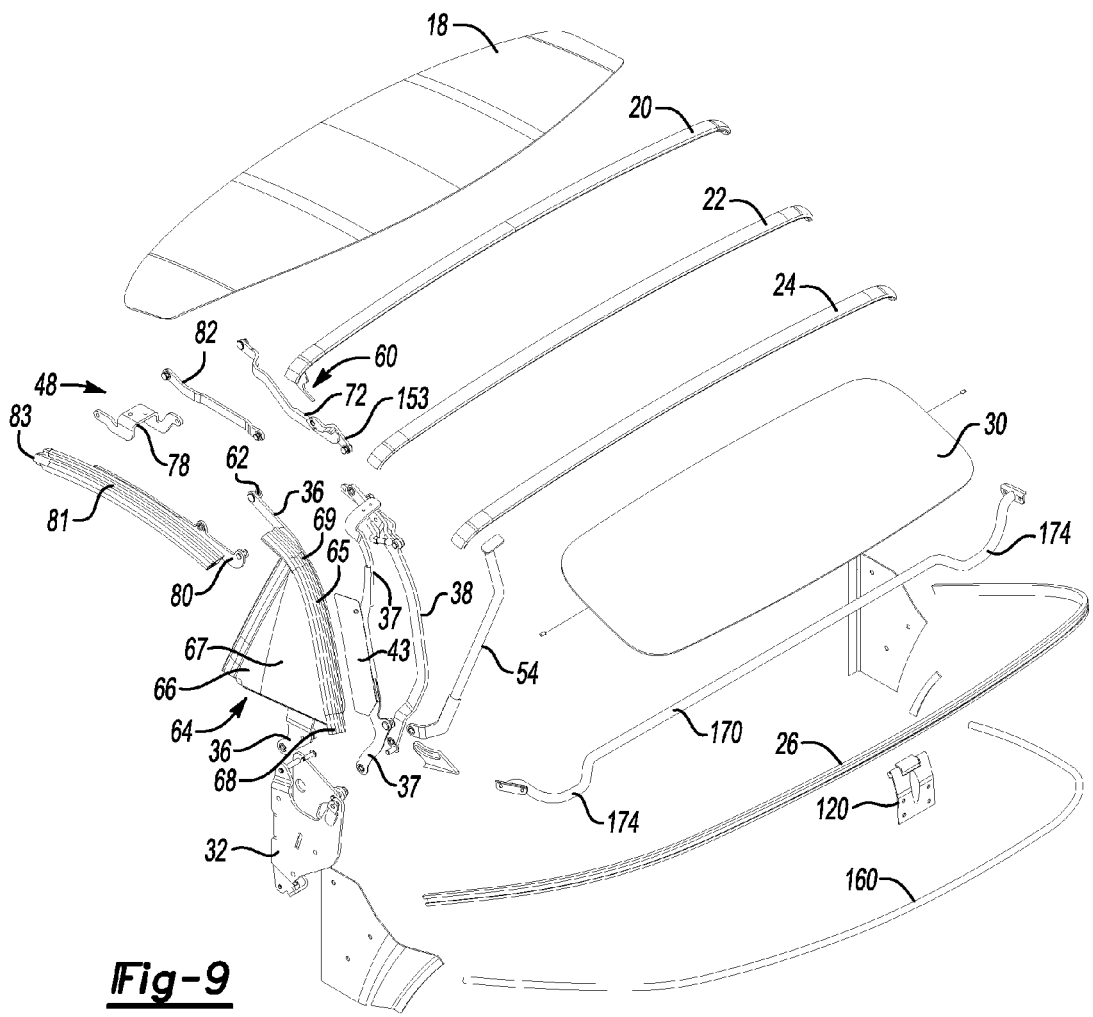
FIG. 9 is an exploded exterior perspective view of the frame shown in FIGS. 2-8.
Figure 10:
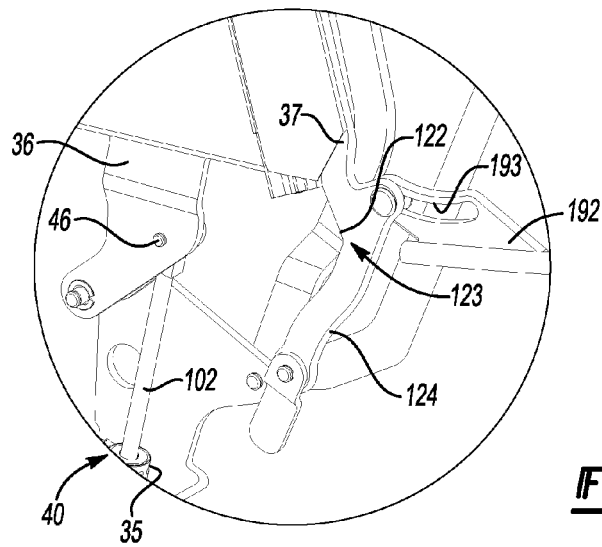
FIG. 10 is an enlarged side elevation view showing a portion of the connections to a pivot bracket shown in FIG. 9 in a closed (extended) position.
Figure 11:
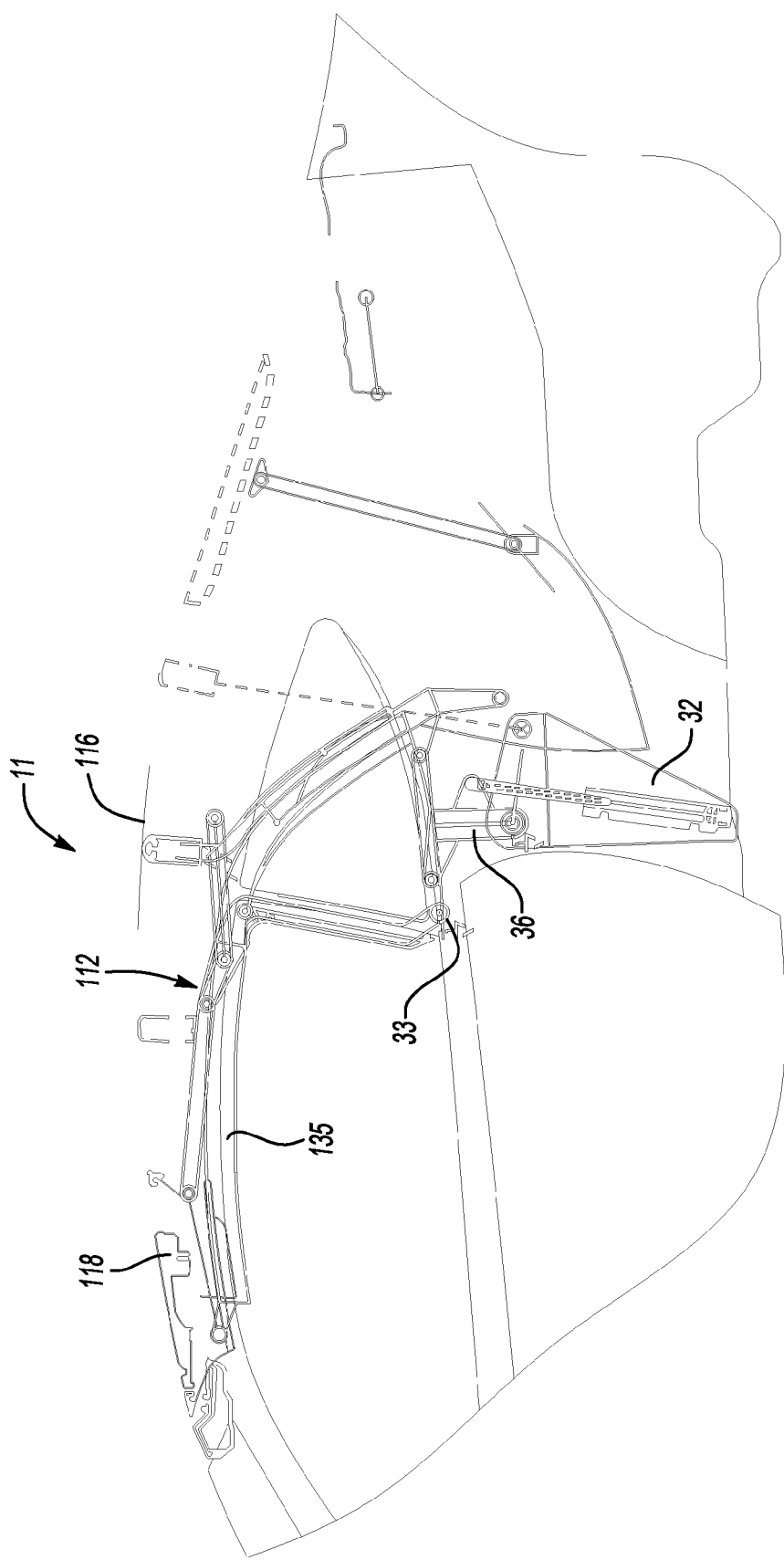
FIG. 11 is a side elevation view showing an alternative kinematic frame with the top in a closed position.
Figure 12:
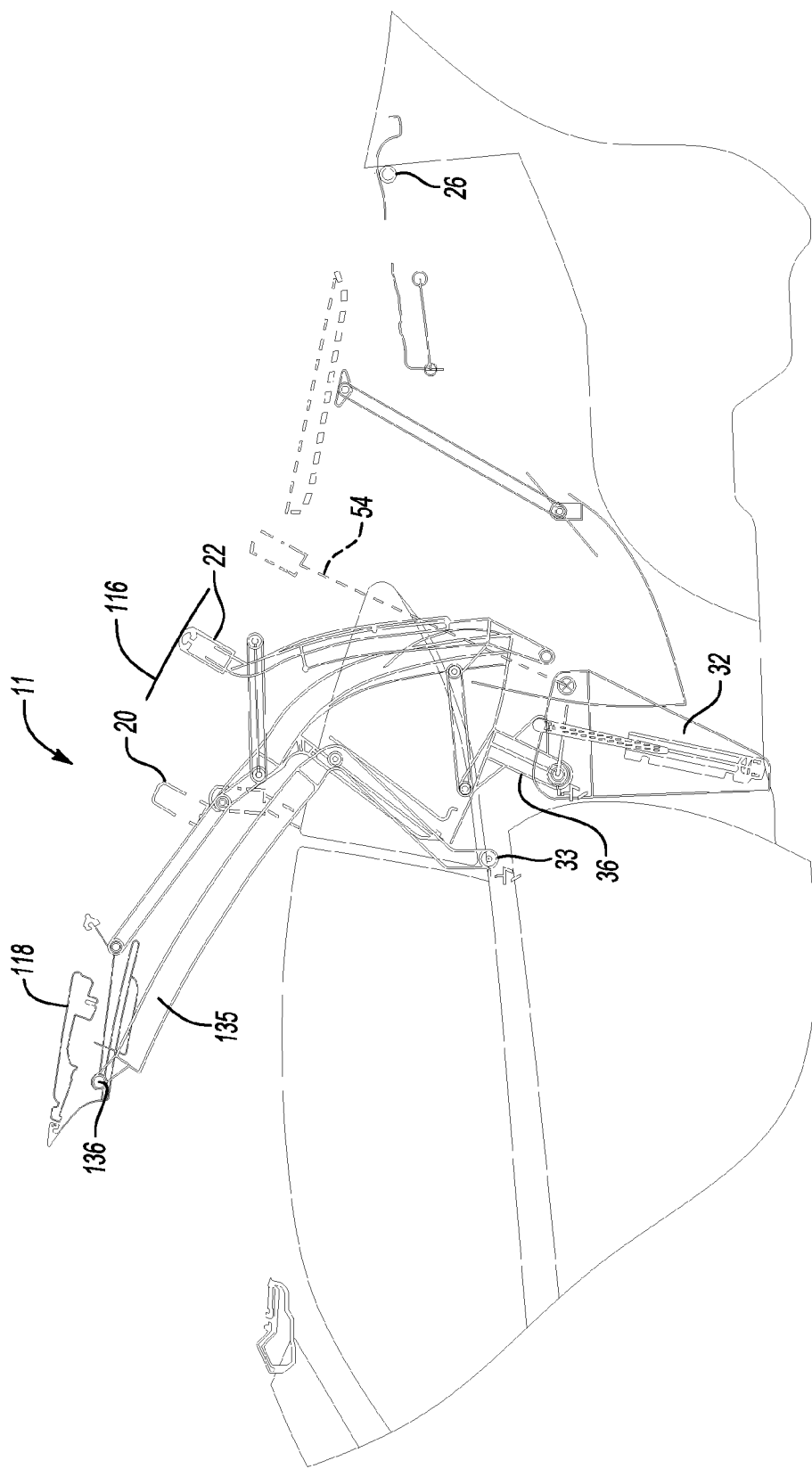
FIG. 12 is a side elevation view of the frame in FIGS. 10-11 with the top in an intermediate position.
Figure 13:
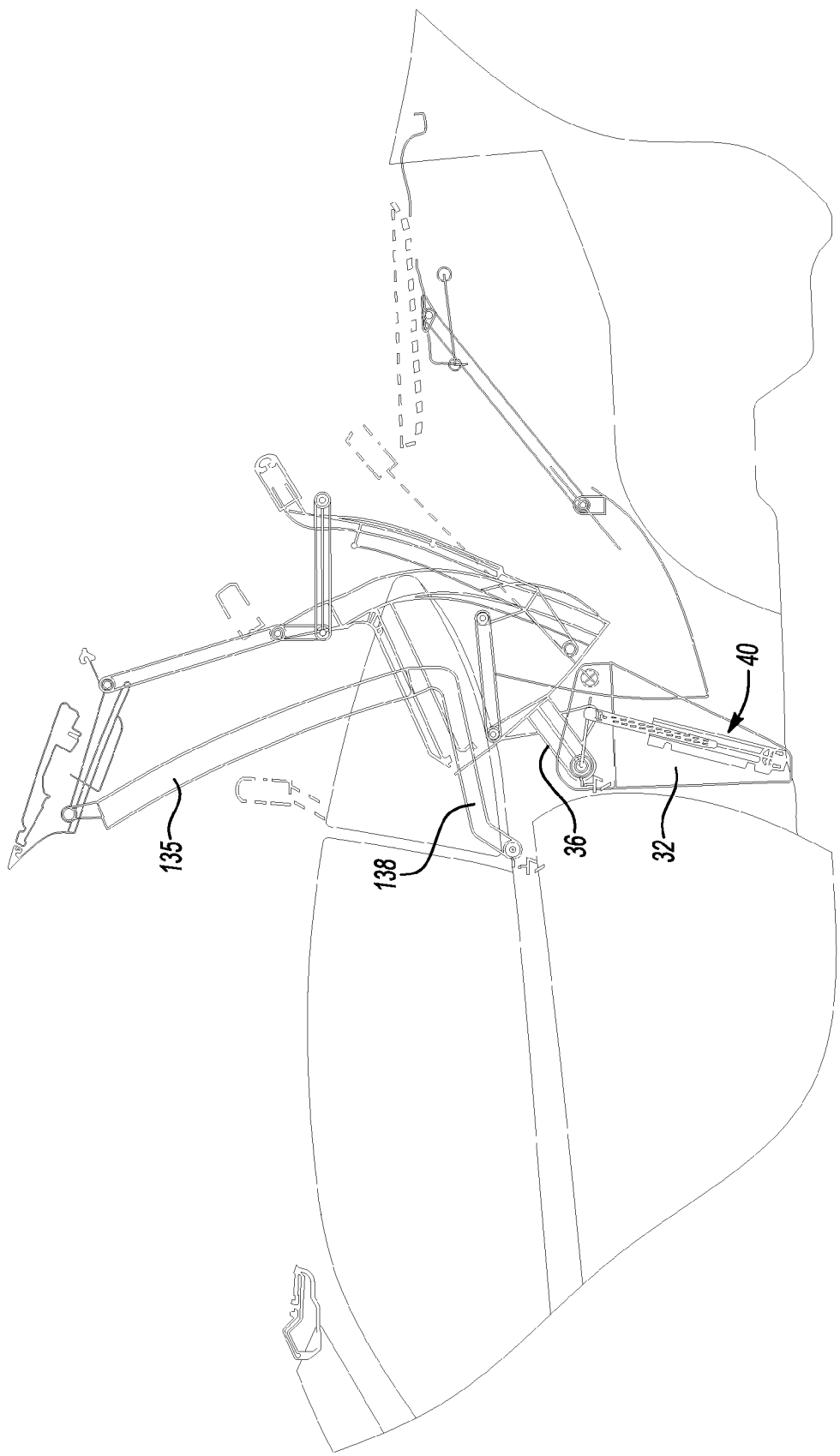
FIG. 13 is a side elevation view of the frame in FIGS. 10-12 with the top in a further intermediate position.
Figure 14:
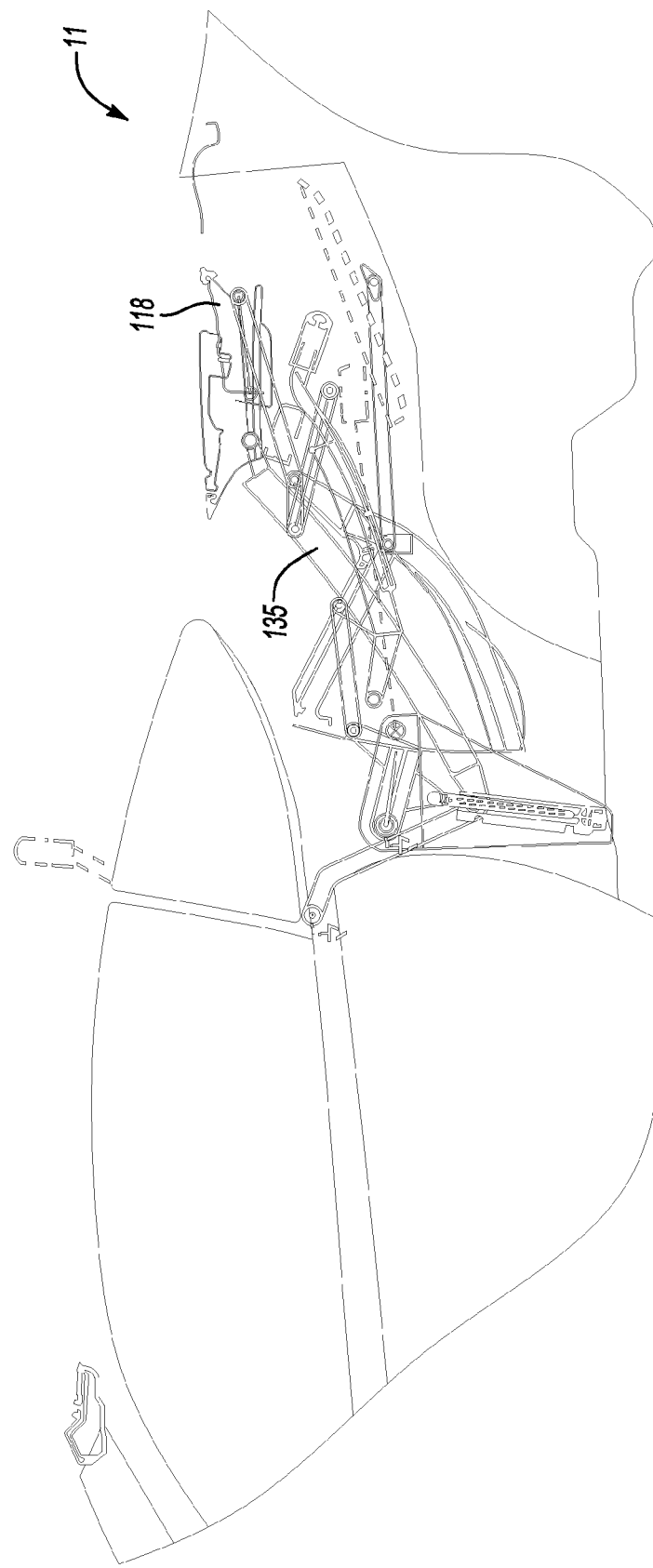
FIG. 14 is a side elevation view of the frame shown in FIGS. 10-12 with the top in the open (retracted) position.

As shown in FIGS. 2-9, a first unitary arch is formed by the laterally spaced rear rails 36 (one shown) and their connections to two bow 20. As shown in FIG. 9, the two bow 20 includes a joining flange 60 securely fastened at the bottom of the two bow 20 and having a depending flange 61 (FIG. 3) including forming a pivotal connection (FIG. 9) 62 for joinder to the upper end of the rear rail 36 on each lateral end of the two bow 20. For example, a rivet may be inserted and retained in registering apertures in the rear rail 36 and the depending flange 61. The arch remains rigid or unitary as defined in the present application as it limits relative movement between the two bow 20 and the rear rails 36 in the longitudinal and lateral directions of the vehicle. Such an arrangement enables the two bow 20 to be pivotally displaced with respect to the rear rail 36 for compact alignment of the top stack in its retracted position. Nevertheless, the pivotal connection 62 provide a laterally and longitudinally rigid connection forming a unitary arch in the framework of the top.

The present invention improves upon the Z fold concept mechanism by providing an embodiment that uses a unitary arch to articulate a quarter window. In the preferred embodiment, a quarter window assembly 64 is securely attached to the rear rail 36. In addition, a three bow 22 supported by control arms 37 (one shown) is also pivotally secured with respect to the vehicle ground. The additional robustness of the frame 12 of the top 10, and the spacing between the forward and rear pivot points of rear rail 36 and control arm 37, respectively enables the control arm 37 to carry a cloth control bracket 43 at which the textile 16 may be joined to the control arm 37 and positioned for engagement against a seal member 65 carried by the quarter window frame 66 when the top is in the open (extended) position. Accordingly, additional robustness of both the control arm 37 and the rear rail 36 forming unitary arches with the bows 20 and 22, respectively, improves control over displacement of the convertible top and improves the ability of the top 10 to seal the passenger compartment against ambient conditions when the top is closed.

An embodiment as shown in FIGS. 11-14 includes a frame 112 in a top 11 that adds an additional pivot for mounting a side rail 135 with respect to the vehicle ground, for example at a mounting plate 33, for the top 11. This structure may also incorporate a rigid mounting of the one bow 118 to the laterally spaced side rails 135 to form a further rigid or unitary arch in the frame. The side rail 135 may also be pivotally secured at 136 (FIG. 12) to the ends of the one bow 118 so that the one bow may be repositioned for packaging during formation of the top stack into retracted position. A one-piece side rail seal 138 (FIG. 13) with no splits may be carried by the side rail 135 to reduce chances for water and wind intrusions and seal continuously against the textile 116 (FIG. 11) to block other ambient conditions that may affect the interior compartment of the vehicle. The seal may be designed to sealingly engage a door glass. The seal may be designed to interface the adjacent quarter glass. In the illustrated embodiment, the seal and the seal support may be shaped to provide a single seal to engage the door glass and interface with the quarter glass assembly carried by the adjacent three bow arch described previously.

Similarly, the four bow 24 may be pivoted by support rails 54 that also form a rigid or unitary arch in the frame 12 or 112 of the top 10 or top 11. In an embodiment, the support rails 54 of the arch, are pivoted with respect to the mounting plate 32 or vehicle ground, such as at the pivot connections in illustrated embodiments. The pivots for control link 37, balance link 38 and rail 54 may have a common axis or spaced discrete axes used for pivoting the two, three, and four bow arches in desired manners. The shapes of the rails may be configured to assure sufficient retraction of the frame 12 for nesting the forward bows above the four bow 24 in the top stack (closed) position of the top.

Referring again to FIG. 9, the rear rail 36 carries a support member 65 for securing the quarter window assembly 64 to the rear rail 36. The quarter window assembly 64 may include a frame 66, a glass panel 67, a seal support 68 and a weather seal member 69. The control link 37 carries the cloth control bracket flange 43 carrying the cloth 16 in a position for engagement with the seal member 69 on the quarter window assembly 64 when the top 10 is in the closed position. The balance link 38 is pivotally coupled to a forward control link 39 at end 139. The opposite end of the forward control link 39 is pivotally coupled to a link 72 forming a lever actuator part of the four bar mechanism 48 carrying the front bow 18. An intermediate pivot connection between the link 72 and the side rail 80 enables the link 72 to lift the one bow 18 that carries a pivot bracket 78. The other end of the pivot bracket 78 is pivotally coupled to an end of a link 82 that is pivoted at its other end to the side rail 80. The side rail 80 also carries a seal support member 81 to which the weather seal strip 83 may be joined in a single piece. In an illustrated embodiment, a single, continuous strip weather seal may be applied along the rail 80 to limit leakage paths. The seal 83 is supported for engagement with a side window below the side rail weather seal 80, and may be supported for engagement with the seal strip 69 carried by the quarter window assembly 64 in the closed (extended) position.

Figure 4:
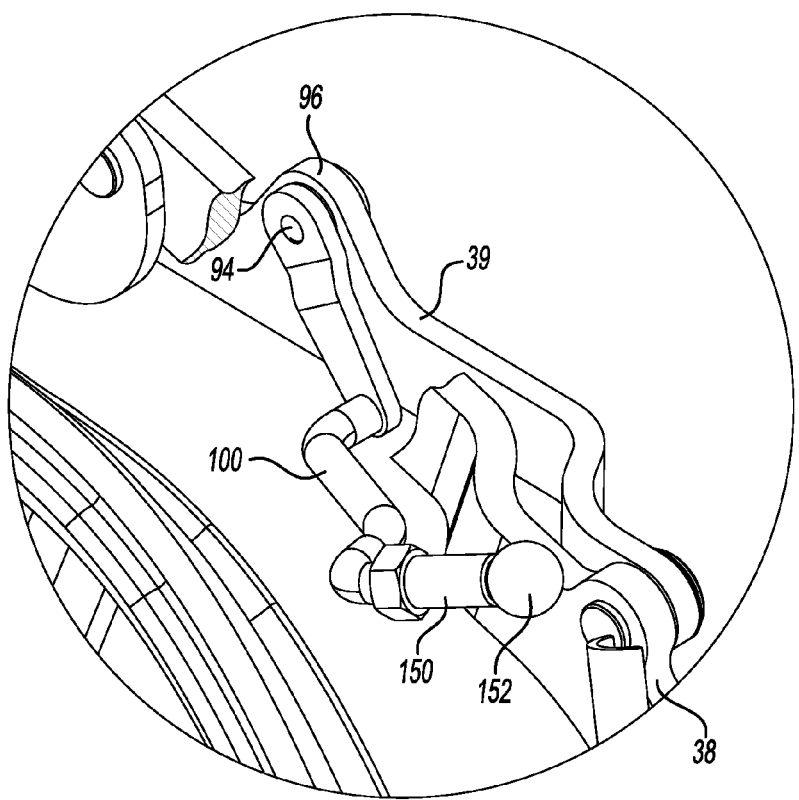
FIG. 4 is an enlarged, exterior perspective view of a portion of the frame 12 according to an embodiment of the present invention shown in FIG. 2 with some structure removed for the sake of clarity.
Figure 5:
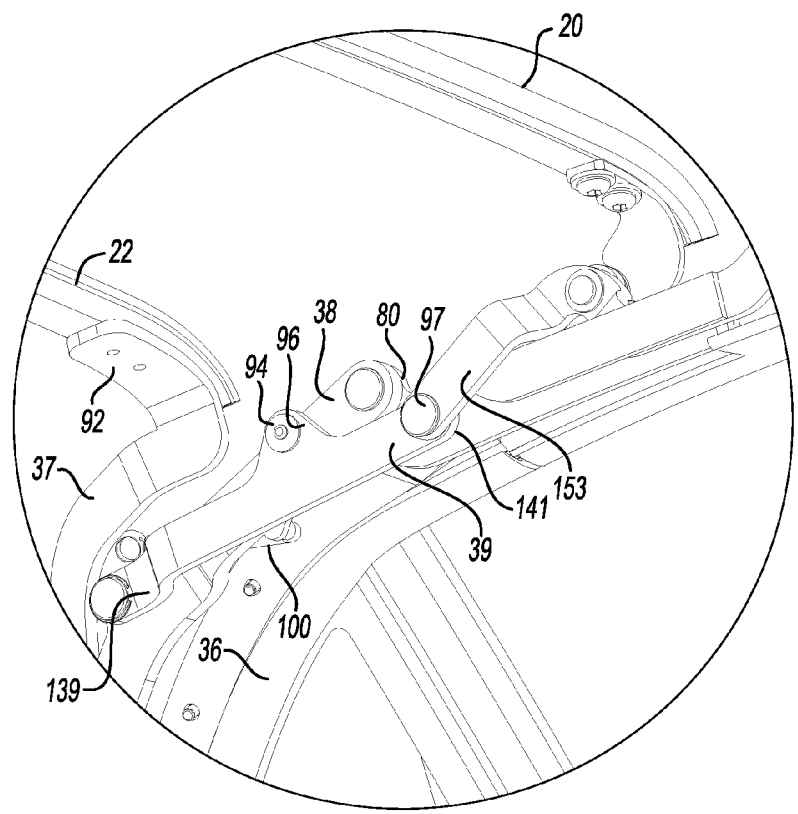
FIG. 5 is an enlarged interior perspective view of the members shown in FIG. 4.
Figure 6:
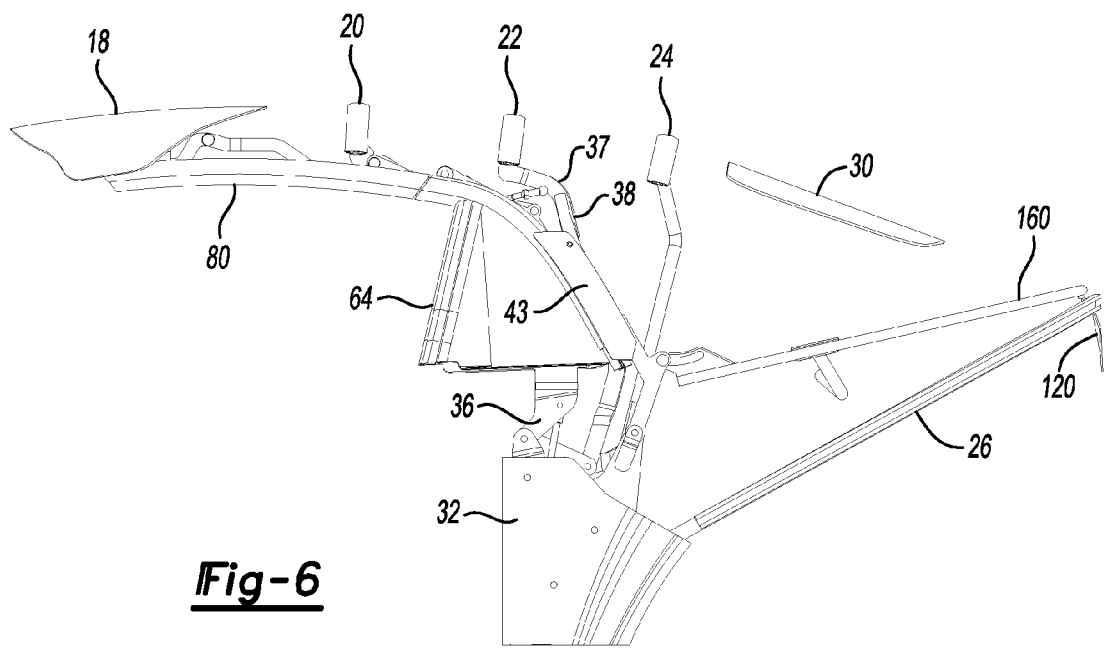
FIG. 6 is side elevation view of a frame embodiment shown in FIGS. 2 and 3 with the top frame in closed (extended) position.
Figure 7:
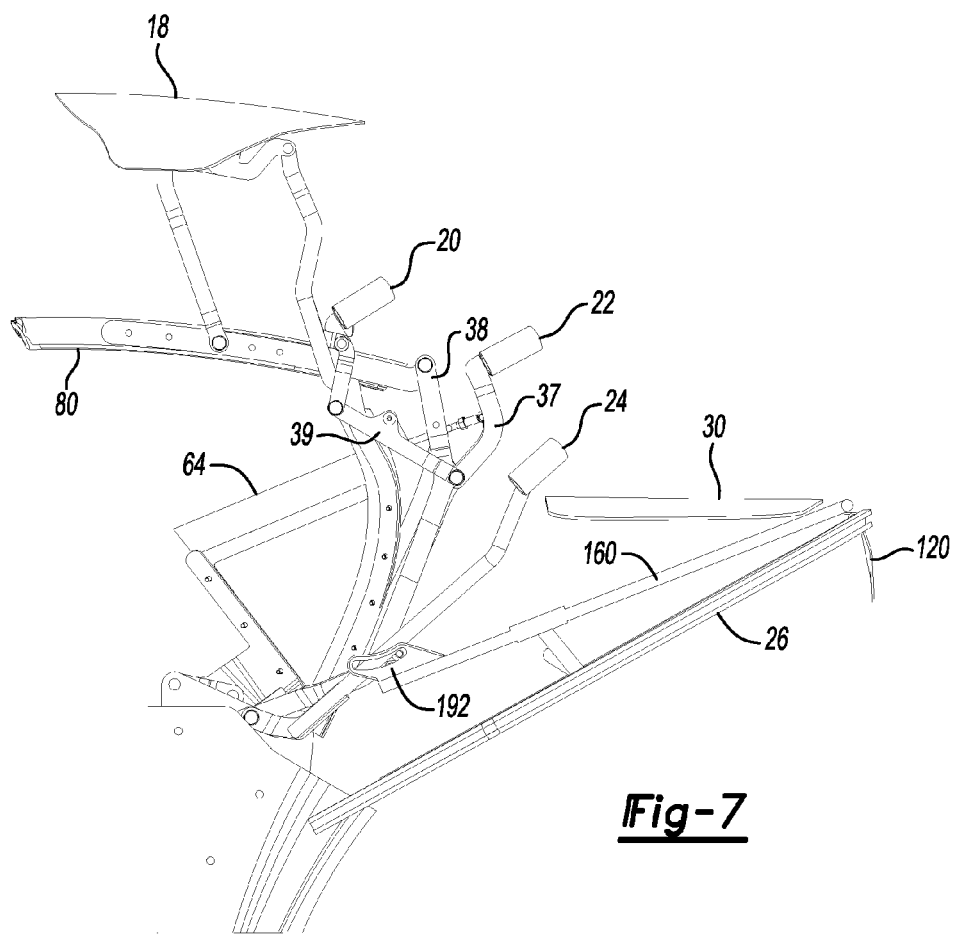
FIG. 7 is a side elevation view similar to FIG. 6 but showing the top in a position intermediate the closed (extended) and open (retracted) positions.

As shown in FIG. 5, the control link 37 includes an expanded flange 92 that can be joined to the three bow 22 in a fixed position. The forward control link 39 has a pivotal connection to the control link 37. As also shown in FIG. 5 at 96, an intermediate portion of the forward control link 39 includes a pivotal connection 94 for a worm link 100, best shown in FIG. 4. As discussed above, the forward end of the forward control link 39 is pivotally coupled at 97 to the link 72 at the lever end 153 of the four bar mechanism 48.

As best shown in FIG. 4, the other end of the worm link 100 is pivotally coupled to the balance link 38 and controls the position of the textile 16 as the frame linkages are being displaced between the closed and open positions of the top. This avoids unintended folds, or forces imposed by the textile's stiffness against the links in the frame from interfering with the non-interfering alignments of the links as the top is being extended or retracted. However, the basic function of the worm link controls bow movement relative to other bow movements. The worm link 100 may be used to control the movement of the cloth control link 37 and its fixed connection to the textile so that the quarter windows seal 69 may properly engage the textile 16 carried by the control link 37 in the closed top position. In addition, the quarter window assembly 64 is properly controlled and stored as part of the top stack without interfering with the cloth control link 37 that carries the textile 16 for sealing engagement during positioning against the quarter glass assembly 64 in the closed position. The worm link 100 is shaped for packaging between linkage members as the frame moves between open and closed positions. The prototype version shown is adjustable in multiple directions and dimensions at 150.

As shown in FIG. 9, the five bow 26 is formed from a tacking strip that may be adhered to interior surfaces of the vehicle panels enclosing a compartment. The tacking strip, or the interior walls of the vehicle body, support and join the edges of textile 16 of the top 10 or 11 to a secure and protected position within the vehicle body. As also shown in FIG. 9, the tacking strip 26, or the interior wall of vehicle body, may carry a spring clip bracket 120 for pivotally supporting the rear end of a tensioning bow 160. The illustrated embodiment may be simple, such as a channeled clip receiving a tubular portion at the rear of the tensioning bow 160.

Figure 15:
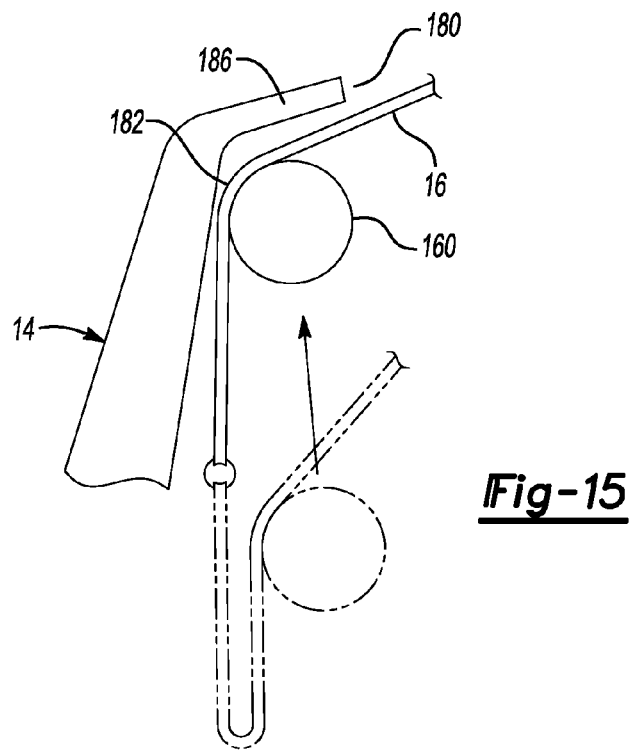
FIG. 15 is an enlarged schematic view of textile displacement performed by the tensioning bow.
Figure 16:
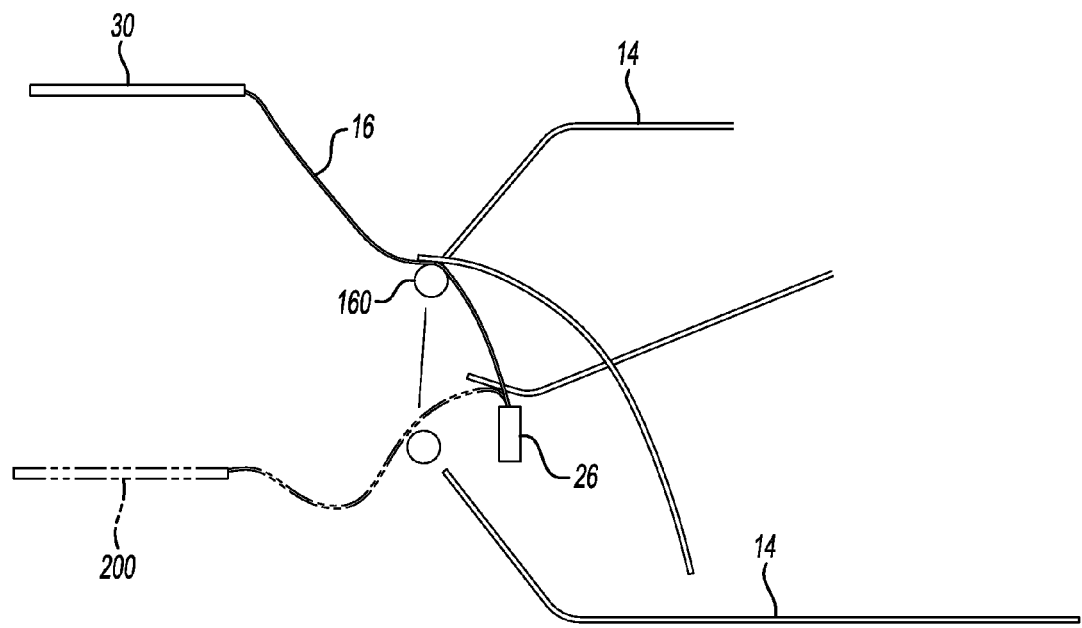
FIG. 16 is an enlarged schematic view similar to FIG. 15 but taken from a different perspective.

Although mounting the tack strip near or below the beltline may require less top material for coverage of the passenger compartment, storage space may become more limited by the short length of the cloth. By lowering the tack line, more material may be required to reach the tack line, but the textile may be lowered farther down into the storage compartment below the top stack to provide more stacking space. The more textile between up and down positions of the top, the front ends of the tensioning bow 160 may move with the frame 12 toward a closer position with the peripheral edge of the vehicle body or beltline. As shown in FIGS. 15 and 16, the tensioning bow 160 may impose a tensioning line 182 along the textile to close the gap 180 between the body panel 14 and the cloth 16. The forward ends of the arcuate member include brackets with lost motion channels 193 (FIG. 10) that limit cloth pressure for movement. The tensioning bow 160 moves upwardly but toward peripheral edges of the inner body panel as shown in FIGS. 15 and 16 when the top is in the closed position to hide the gap 180 with the extra cloth.

The tensioning bow 160 positions the textile toward the body panel in a closed (extended) position by imposing a tensioning line 182 on the textile 16. Pivoting about the fixed rear axis, the front ends may be driven down by the front linkage bracket 192 (FIG. 7) to release more textile for the top in its retracted position. Accordingly, the cloth 16 and the back light 30 are releasable to a position below the top stack as shown at 200 in FIG. 16.

The convertible top 10 may be opened and closed manually. However, an actuator 40 such as cylinder 35, or a linear or electric motor drive, may be operatively connected to either the balance link 38, rear rail 36, or other part of the top stack linkage 12 that is displaceably grounded to the vehicle. Such an actuator 40 may drive the bow supporting links 37, 38, 39 as the top stack linkage 12 is moved between the extended position shown in FIGS. 1 and 6 and the retracted position shown in FIGS. 8 and 14, as will be described below.

A cylinder 35 may be connected to the top stack linkage 12. The cylinder may be a hydraulic or pneumatic cylinder that extends and retracts an extension rod 102. The extension rod 102 is connected by a pivot pin 46 to a member of the top stack linkage 12. The top stack linkage 12 of the top 10 includes a front four bar linkage generally indicated by reference numeral 48 supporting the one bow 18, the supports for the other bows and other balance links. The cylinder 35 reciprocally drives the extension rod 102 to simultaneously lift the one bow 18 supported by the front four bar linkage 48 through the forward control link 39, when it is desired to move the top stack linkage 12 from the extended position shown in FIG. 1 toward the retracted position shown in FIG. 8. As used herein, the term "simultaneously" should be understood to mean generally at the same time as permitted by the mechanism described. The cylinder 35 has rod 102 that extends to the rear rail 36 that supports the two bow 20, preferably displacing the rigid arch.

The cloth control link 37 is provided with a textile attachment plate 43 that allows the frame 12 to displace and store the quarter window frame 64 assembly and rear rail 36 adjacent to the control link 37 with the top stack in the open (retracted) position of the top. In the closed position, the textile attachment plate is positioned for engaging the textile against the quarter window seal 69, usually carried by the window frame 64, in the closed (extended) position of the top 10.

Unlike previously known top constructions in which a rear rail may carry the textile for engaging against the window frame seal that is displaced by a mechanism separate from the top stack linkage 12, the retraction of a top 10 according to the present invention, where the rear rail arch carries the quarter window frame, benefits from not fixing the textile on the rear rail throughout the displacement of the top. Rather, the textile 16 may be displaced and relatively repositioned, for example, further back from or below the position at which the quarter window frame is positioned in the top stack (retracted position). As shown in the illustrated embodiment, the cloth control link 37 is pivoted at a position rearward of the rear rail 36. Moreover, the positioning may be further addressed by shaping of the control link 37, as at the hooked end 123 (FIG. 10) having directionally bent extension 122 and laterally bent portion 124.

In addition, the frame 12 may be provided with other controls for proper positioning of components including the displaced cloth during and after displacement between the closed (extended) position and the open position of the top. The worm link 100 may be provided for cooperation between components of the frame, such as between the cloth control link and the main kinematic arrangement of components, so that the cloth control link 37 is not influenced by or inefficiently displaced due to resistance by the cloth. That cloth may be relatively stiff and impede proper positioning of the linkages, for example, interfering with proper spacing between the cloth control link carrying the cloth and the adjacent driven rear rail.

An embodiment shown introduces a worm link 100 (FIG. 4) for coordinating displacement of pivoting frame components, mainly between the rear rail quarter glass frame 66 and the cloth control link 37. This link 100 stabilizes the kinematic arrangement so that the cloth portion carried for side engagement by the cloth control plate 43 may seal tightly against the seal 69 carried by the quarter glass frame 66 mounted to the rear rail 36. The shape or contours employed in the link 100 may be determined as depends upon the shape and positions of various rails and links in the frame 12, and may be made adjustable for fit and finish as the sealing position (top closed) and top stack (top open) may demand.

An embodiment of the worm link 100 shown in FIG. 4 couples one end of the worm link 100 with the cloth control link 37 through a swivel connector 152. The other end is pivotally secured about a laterally aligned pivot axis of connector pivot 94 (FIG. 5) to the forward control link 39. The forward control link 39 has end 139 pivotally coupled to an intermediate portion of the balance link 38. The other end 141 of the forward control link 39 is pivotally mounted to the lever end portion 153 of the link 72 that pivots with respect to the side rail 80 to lift the one bow 18 as an actuator part 153 of the four bar mechanism 48. The worm link 100 is shaped for packaging between the linkages during movement and positioning extremes as will be evident from the views of the drawing figures showing features discussed above.

A fabric tensioning bow 160 may be added to the frame 12 to position a portion of the textile against or toward the inner periphery of the vehicle body to close a gap 180 between the vehicle panel 14 and the top 16 in closed (extended) position. For example, the bow 160 may extend along a tension line 182 that is covered by an overhang flange 186. The bow 160 controls a greater amount of cloth 16 that may be employed to move frame 12 between closed and open top positions. The tension bow 160 pivots around a lateral axis provided in the pivot bracket 120 at the rear of the vehicle compartment. For example, the bracket 120 may have a channel, defining a single pivotal axis, receiving the tubular member forming the bow 160. However, the pivot may be made by substantially different structures such as a four bar mechanism, multiple hinges or a clamp. The front ends of the tensioning bow 160 move with the main kinematic of the top frame 12. The textile length exceeds the distance between tension bow's uppermost position at the body panel and the tack strip 26 at which the textile 16 is fixed to the vehicle body, and must be free for displacement with the top stack when the tensioning bow 160 is displaced downwardly for top down position.

Adding a crossbar 170 and a fabric layer 172 (FIG. 3) covering over the crossbar 170 and the tensioning bow 160, a package shelf 180 is created that appears similar to a package shelf beneath a rear window glass appearing in most hardtop vehicles, whereby the trunk area may be hidden behind the seating. The crossbar 170 may be configured to accommodate portions of the frame, for example, as shown at 174 (FIG. 3), to permit lowering of the side rails 36, 37, 38 within at a lower position within the vehicle compartment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A Z-fold convertible top for a vehicle body comprises:
   a textile cover;
   a frame supporting the textile cover, the frame having at least one laterally spaced pair of rear rails and at least one middle bow fixedly attached to the laterally spaced pair of rear rails; and
   a pair of laterally spaced side rails and at least one forward bow fixedly attached to the pair of laterally spaced side rails, wherein each of the pair of side rails and the pair of rear rails being pivotally mounted for relative displacement with respect to ground of the vehicle body, wherein each rail of the pair of side rails includes at least one seal support, wherein each at least one seal support carries a single seal member positioned for engagement with an adjacent window, and wherein each rail of the pair of rear rails supports a glass window and the seal member engages the glass window.

2. The Z-fold convertible top as defined in claim 1 wherein said pair of side rails are pivotally secured to the forward bow.

3. The Z-fold convertible top as defined in claim 1 wherein the glass window includes a side rail seal support and a second seal member on the window glass engaging the seal member on the side rail seal support.

4. A Z-fold convertible top for a vehicle body comprises:
   a textile cover;
   a frame supporting the textile cover, the frame having at least two laterally spaced pairs of rails and at least one crossbar rigidly attached to each pair of the laterally spaced pair of rails;
   a side plate supporting a pivotal connection of each of the laterally spaced rails with respect to the vehicle body, wherein at least one pair of laterally spaced rails and the crossbar form a unitary arch pivotable about said pivotal connection;
   a one bow, a pair of side rails and a linkage for lifting and pivoting the one bow relative to the pair of side rails;
   a rear bow comprising a tack strip mounted to a periphery of a vehicle interior compartment for securing a portion of the textile cover to vehicle ground; and
   a tensioning bow having an arch secured at the rear of the vehicle body, and a bracket carrying a forward end of the bow upwardly, wherein a vehicle interior compartment is defined by a body panel inner wall and an intermediate portion of the tensioning bow engages the inner wall when the top is in an extended position.

5. The convertible top as defined in claim 4 wherein the body panel inner wall has an overhang flange.

6. The convertible top as defined in claim 4 wherein the bracket is engaged by the frame as the convertible top is refracted to an open position.

7. The convertible top as defined in claim 6 wherein a control link of the frame engages the bracket.

8. A Z-fold convertible top for a vehicle body comprises:
- a textile cover;
- a frame supporting the textile cover, the frame having at least two laterally spaced pairs of rails and at least one crossbar rigidly attached to each pair of the laterally spaced pair of rails;
- a side plate supporting a pivotal connection of each of the laterally spaced rails with respect to the vehicle body, wherein at least one pair of laterally spaced rails and the crossbar form a unitary arch pivotable about said pivotal connection;
- a one bow, a pair of side rails and a linkage for lifting and pivoting the one bow relative to the pair of side rails;
- a rear bow comprising a tack strip mounted to a periphery of a vehicle interior compartment for securing a portion of the textile cover to vehicle ground;
- a tensioning bow having an arch secured at the rear of the vehicle body, and a bracket carrying a forward end of the bow upwardly; and a crossbar carried laterally across the arch.

9. The convertible top as defined in claim 8 wherein said crossbar is tubular.

10. The convertible top as defined in claim 8 wherein said crossbar carries the textile cover.

11. The convertible top as defined in claim 8 wherein the crossbar is configured to receive the rails as the frame approaches an open position.

12. A Z-fold convertible top for a vehicle body comprising:
- a textile cover;
- a frame supporting the textile cover, the frame having at least one laterally spaced pair of rails and at least one crossbar rigidly attached to the laterally spaced pair of rails;
- a side plate supporting a pivotal connection of each of the laterally spaced rails with respect to the vehicle body, wherein the pair of laterally spaced rails and the crossbar form a unitary arch pivotable about said pivotal connection; and
- a quarter window frame secured to the pair of laterally spaced rails for displacement with the unitary arch.

13. The convertible top as defined in claim 12 wherein the pair of rails further comprise:
- a door glass seal support; and
- a quarter window interface.

14. The convertible top as defined in claim 13 wherein said door glass seal support and quarter window interface carry a one piece seal.

* * * * *